US009541775B2

(12) United States Patent
Ayazi et al.

(10) Patent No.: US 9,541,775 B2
(45) Date of Patent: Jan. 10, 2017

(54) METHOD AND SYSTEM FOR A LOW-VOLTAGE INTEGRATED SILICON HIGH-SPEED MODULATOR

(71) Applicant: Luxtera, Inc., Carlsbad, CA (US)

(72) Inventors: Ali Ayazi, San Diego, CA (US); Kam-Yan Hon, Oceanside, CA (US); Gianlorenzo Masini, Carlsbad, CA (US)

(73) Assignee: Luxtera, Inc., Carlsbad, CA (US)

( * ) Notice: Subject to any disclaimer, the term of this patent is extended or adjusted under 35 U.S.C. 154(b) by 63 days.

(21) Appl. No.: 14/217,743

(22) Filed: Mar. 18, 2014

(65) Prior Publication Data

US 2014/0286647 A1   Sep. 25, 2014

Related U.S. Application Data

(60) Provisional application No. 61/852,702, filed on Mar. 19, 2013.

(51) Int. Cl.
| | |
|---|---|
| *H04B 10/40* | (2013.01) |
| *G02F 1/025* | (2006.01) |
| *G02F 1/225* | (2006.01) |
| *H04B 10/50* | (2013.01) |
| *G02F 1/21* | (2006.01) |

(52) U.S. Cl.
CPC ............ *G02F 1/025* (2013.01); *G02F 1/2255* (2013.01); *G02F 1/2257* (2013.01); *H04B 10/501* (2013.01); *G02F 2001/212* (2013.01)

(58) Field of Classification Search
CPC ....... H04B 10/40; H04B 10/548; G02F 1/025; G02F 1/225; G02F 1/2255; G02F 1/2257

USPC ........ 398/135–139, 182–183, 188, 200, 201; 385/1–3, 14, 28, 50, 130; 359/245–250; 257/351; 438/31
See application file for complete search history.

(56) References Cited

U.S. PATENT DOCUMENTS

| | | | | |
|---|---|---|---|---|
| 5,148,503 | A * | 9/1992 | Skeie | G02F 1/225 385/16 |
| 5,933,554 | A * | 8/1999 | Leuthold | G02F 1/3517 385/14 |
| 6,845,198 | B2 * | 1/2005 | Montgomery et al. | 385/50 |
| 7,747,122 | B2 * | 6/2010 | Shetrit et al. | 385/130 |
| 8,149,493 | B2 * | 4/2012 | Chen | 359/250 |
| 2002/0048443 | A1 * | 4/2002 | Itoh | G02B 6/122 385/132 |

(Continued)

FOREIGN PATENT DOCUMENTS

GB   2477935 A *   8/2011   ............. G02F 1/025

*Primary Examiner* — Li Liu
(74) *Attorney, Agent, or Firm* — McAndrews, Held & Malloy, Ltd.

(57) ABSTRACT

Methods and systems for a low-voltage integrated silicon high-speed modulator may include an optical modulator comprising first and second optical waveguides and two optical phase shifters, where each of the two optical phase shifters may comprise a p-n junction with a horizontal section and a vertical section and an optical signal is communicated to the first optical waveguide. A portion of the optical signal may then be coupled to the second optical waveguide. A phase of at least one optical signal in the waveguides may be modulated utilizing the optical phase shifters. A portion of the phase modulated optical signals may be coupled between the two waveguides, thereby generating two output signals from the modulator. A modulating signal may be applied to the phase shifters which may include a reverse bias.

20 Claims, 7 Drawing Sheets

(56) References Cited

U.S. PATENT DOCUMENTS

| | | | |
|---|---|---|---|
| 2003/0231279 A1* | 12/2003 | Wessel | G02F 1/1326 349/198 |
| 2004/0208454 A1* | 10/2004 | Montgomery et al. | 385/50 |
| 2010/0059822 A1* | 3/2010 | Pinguet et al. | 257/351 |
| 2010/0060970 A1* | 3/2010 | Chen | 359/245 |
| 2010/0080504 A1* | 4/2010 | Shetrit et al. | 385/14 |
| 2011/0042553 A1* | 2/2011 | Masini et al. | 250/214 A |
| 2011/0305416 A1* | 12/2011 | Mekia et al. | 385/28 |
| 2012/0201488 A1* | 8/2012 | Liow et al. | 385/3 |
| 2014/0127842 A1* | 5/2014 | Song et al. | 438/31 |
| 2014/0241658 A1* | 8/2014 | Chen et al. | 385/3 |
| 2014/0248019 A1* | 9/2014 | Witzens et al. | 385/2 |
| 2014/0299743 A1* | 10/2014 | Miller | G02B 27/145 250/204 |

\* cited by examiner

METHOD AND SYSTEM FOR A LOW-VOLTAGE INTEGRATED SILICON HIGH-SPEED MODULATOR

CROSS-REFERENCE TO RELATED APPLICATIONS/INCORPORATION BY REFERENCE

This application claims priority to U.S. Provisional Application 61/852,702, filed on Mar. 19, 2013, which is hereby incorporated herein by reference in its entirety.

FIELD

Certain embodiments relate to semiconductor processing. More specifically, certain embodiments relate to a method and system for a low-voltage integrated silicon high-speed modulator.

BACKGROUND

As data networks scale to meet ever-increasing bandwidth requirements, the shortcomings of copper data channels are becoming apparent. Signal attenuation and crosstalk due to radiated electromagnetic energy are the main impediments encountered by designers of such systems. They can be mitigated to some extent with equalization, coding, and shielding, but these techniques require considerable power, complexity, and cable bulk penalties while offering only modest improvements in reach and very limited scalability. Free of such channel limitations, optical communication has been recognized as the successor to copper links.

Further limitations and disadvantages of conventional and traditional approaches will become apparent to one of skill in the art, through comparison of such systems with the present invention as set forth in the remainder of the present application with reference to the drawings.

BRIEF SUMMARY

A system and/or method for a low-voltage integrated silicon high-speed modulator, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION

Certain aspects of the disclosure may be found in a method and system for a low-voltage integrated silicon high-speed modulator. Exemplary aspects of the disclosure may comprise an optical modulator comprising first and second optical waveguides and two optical phase shifters, where each of the two optical phase shifters comprise a p-n junction with a horizontal section and a vertical section, and where an optical signal is communicated to the first optical waveguide. A portion of the optical signal may then be coupled to the second optical waveguide. A phase of at least one optical signal in the first and second waveguides may be modulated utilizing the optical phase shifters. A portion of the phase modulated optical signals may be coupled between the two waveguides, thereby generating two output signals from the modulator. A modulating signal may be applied to the phase shifters. The p-n junction of the phase shifters may be reverse biased for modulating the phase of the at least one optical signal. The horizontal and vertical sections of the p-n junction may form an "L" shape. The p-n junction may comprise three rectangular sections, a first section being an p-type semiconductor layer, a second section being a portion of an n-type semiconductor layer coplanar with the first section, and a third section being another portion of the n-type semiconductor layer but formed above the first and second sections. The p-n junction may be reverse biased such that a depletion width of the p-n junction extends across most but not all of the third section. The modulator may be integrated in silicon. The horizontal and vertical sections of the p-n junction may be formed in a waveguide rib. The modulator may be integrated in a CMOS chip. The p-n junction may be formed by ion implantation.

Figure 1A:
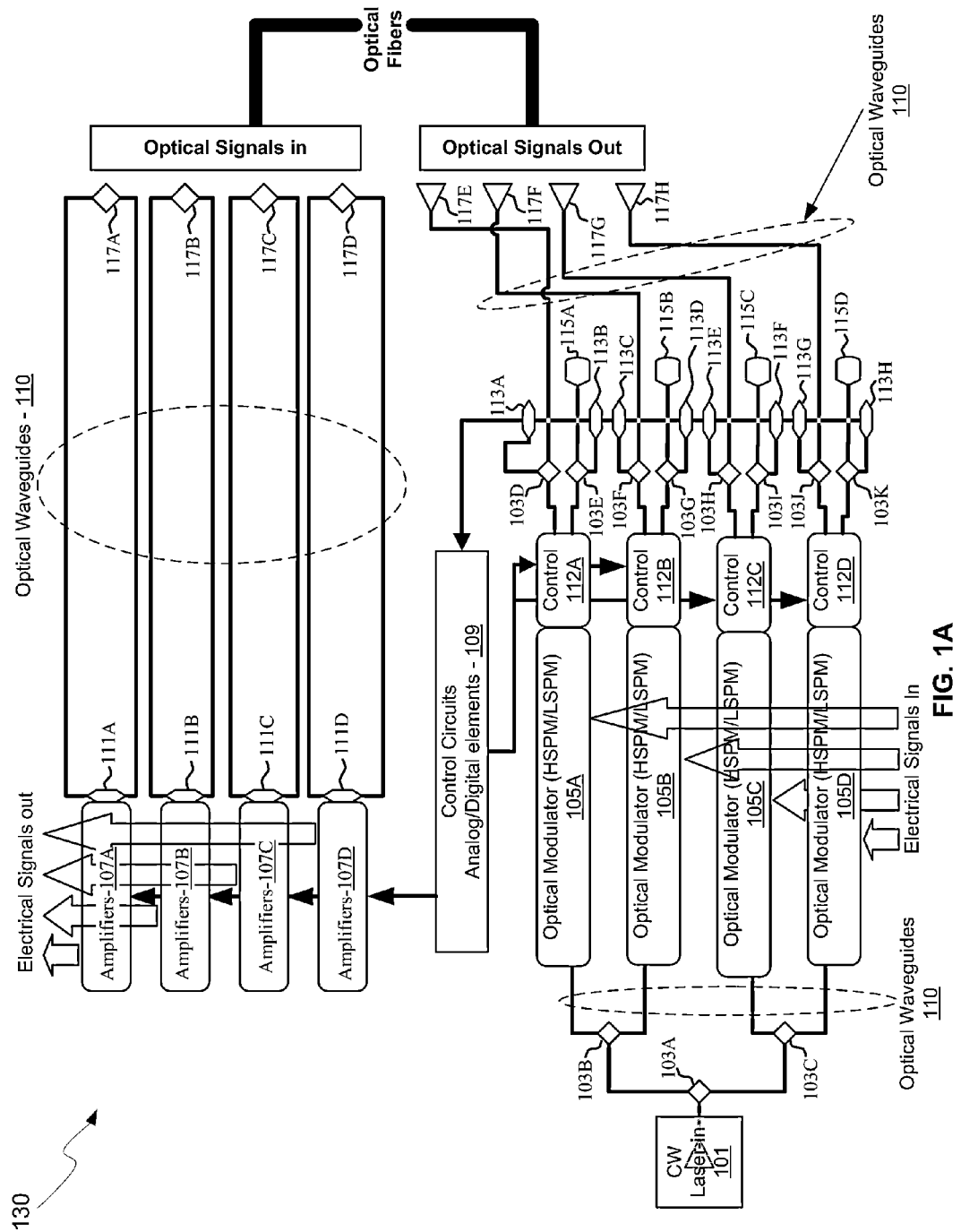
FIG. 1A is a block diagram of a photonically enabled CMOS chip comprising low-voltage, high-speed modulators, in accordance with an example embodiment of the disclosure.

FIG. 1A is a block diagram of a photonically enabled CMOS chip comprising low-voltage, high-speed modulators, in accordance with an example embodiment of the disclosure. Referring to FIG. 1A, there is shown optoelectronic devices on a CMOS chip 130 comprising optical modulators 105A-105D, photodiodes 111A-111D, monitor photodiodes 113A-113H, and optical devices comprising directional couplers 103A-103K, optical terminations 115A-115D, and grating couplers 117A-117H. There are also shown electrical devices and circuits comprising amplifiers 107A-107D, analog and digital control circuits 109, and control sections 112A-112D. The amplifiers 107A-107D may comprise transimpedance and limiting amplifiers (TIA/LAs), for example.

Optical signals are communicated between optical and optoelectronic devices via optical waveguides 110 fabricated in the CMOS chip 130. Single-mode or multi-mode waveguides may be used in photonic integrated circuits. Single-mode operation enables direct connection to optical signal processing and networking elements. The term "single-mode" may be used for waveguides that support a single mode for each of the two polarizations, transverse-electric (TE) and transverse-magnetic (TM), or for waveguides that are truly single mode and only support one mode whose polarization is TE, which comprises an electric field parallel to the substrate supporting the waveguides. Two typical waveguide cross-sections that are utilized comprise strip waveguides and rib waveguides. Strip waveguides typically comprise a rectangular cross-section, whereas rib waveguides comprise a rib section on top of a waveguide slab.

The optical modulators 105A-105D comprise Mach-Zehnder or ring modulators, for example, and enable the modulation of the continuous-wave (CW) laser input signal. The optical modulators 105A-105D comprise high-speed and low-speed phase modulation sections and are controlled by the control sections 112A-112D. The high-speed phase modulation section of the optical modulators 105A-105D may modulate a CW light source signal with a data signal. The low-speed phase modulation section of the optical modulators 105A-105D may compensate for slowly varying phase factors such as those induced by mismatch between the waveguides, waveguide temperature, or waveguide stress and this low-speed adjustment or modulation is referred to as the passive phase, or the passive biasing of the MZI.

Figure 2:
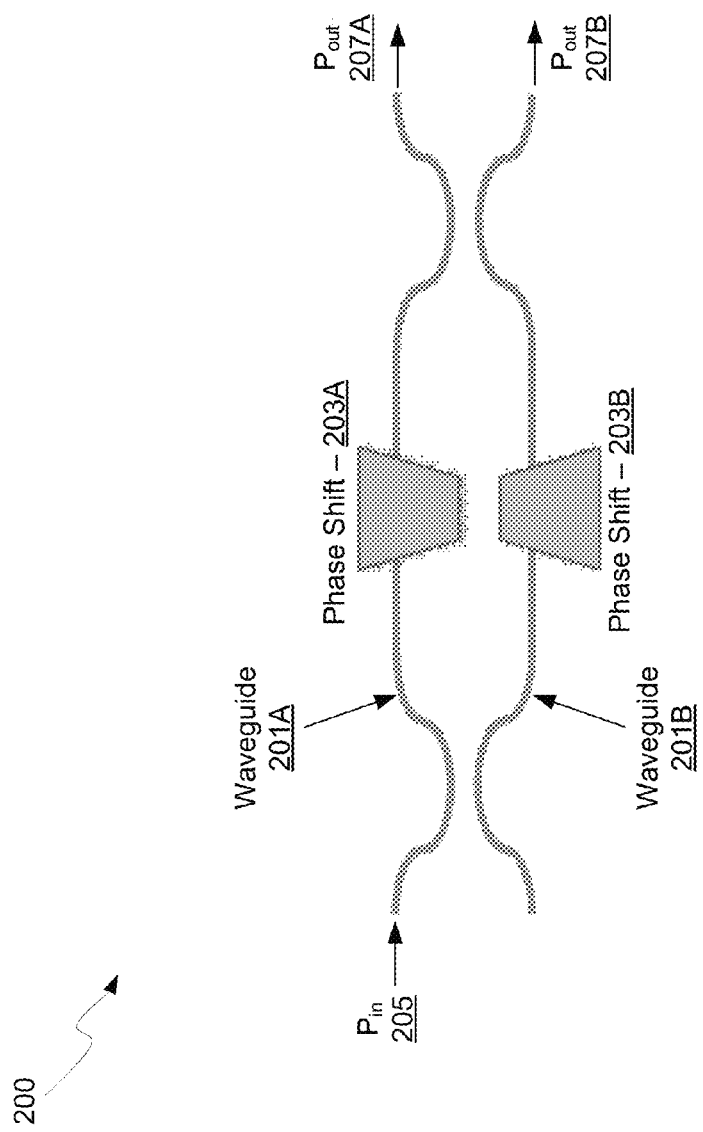
FIG. 2 is a schematic illustrating an electro-optic modulator, in accordance with an example embodiment of the disclosure.

The electro-optical modulator is one of the main building blocks in silicon photonic transceiver circuits. In general, both phase and intensity can be used to modulate light. A conventional phase modulator on a silicon platform is a p-n junction embedded into a waveguide. It is often used in a Mach-Zehnder interferometer configuration, which consists of two arms receiving similar optical intensity after a power splitter. With each arm endowed with a phase modulator, it is then possible to achieve intensity modulation by interfering the outputs of the two arms, using a power combiner, as shown in FIG. 2.

The phase modulators may have a dual role: to compensate for the passive biasing of the MZI and to apply the additional phase modulation used to modulate the light intensity at the output port of the MZI according to a data stream. The former phase tuning and the latter phase modulation may be applied by separate, specialized devices, since the former is a low speed, slowly varying contribution, while the latter is typically a high speed signal. These devices are then respectively referred to as the LSPM and the HSPM. Examples for LSPM are thermal phase modulators (TPM), where a waveguide portion is locally heated up to modify the index of refraction of its constituting materials, or forward biased PIN junction phase modulators (PINPM) where current injection into the PIN junction modifies the carrier density, and thus the index of refraction of the semiconductor material. An example of an HSPM is a reversed biased PIN junction, where the index of refraction is also modulated via the carrier density, but which allows much faster operation, albeit at a lower phase modulation efficiency per waveguide length.

The outputs of the modulators 105A-105D may be optically coupled via the waveguides 110 to the grating couplers 117E-117H. The directional couplers 103A-103K may comprise four-port optical couplers, for example, and may be utilized to sample or split the optical signals generated by the optical modulators 105A-105D, with the sampled signals being measured by the monitor photodiodes 113A-113H. The unused branches of the directional couplers 103D-103K may be terminated by optical terminations 115A-115D to avoid back reflections of unwanted signals.

The grating couplers 117A-117H comprise optical gratings that enable coupling of light into and out of the CMOS chip 130. The grating couplers 117A-117D may be utilized to couple light received from optical fibers into the CMOS chip 130, and the grating couplers 117E-117H may be utilized to couple light from the CMOS chip 130 into optical fibers. The grating couplers 117A-117H may comprise single polarization grating couplers (SPGC) and/or polarization splitting grating couplers (PSGC). In instances where a PSGC is utilized, two input/output, waveguides may be utilized.

The optical fibers may be epoxied, for example, to the CMOS chip, and may be aligned at an angle from normal to the surface of the CMOS chip 130 to optimize coupling efficiency. In an example embodiment, the optical fibers may comprise single-mode fiber (SMF) and/or polarization-maintaining fiber (PMF).

In another exemplary embodiment, optical signals may be communicated directly into the surface of the CMOS chip 130 without use of optical fibers by directing a light source on an optical coupling device in the chip, such as the light source interface 135 and/or the optical fiber interface 139. This may be accomplished with directed laser sources and/or optical sources on another chip flip-chip bonded to the CMOS chip 130.

The photodiodes 111A-111D may convert optical signals received from the grating couplers 117A-117D into electrical signals that are communicated to the amplifiers 107A-107D for processing. In another embodiment of the invention, the photodiodes 111A-111D may comprise high-speed heterojunction phototransistors, for example, and may comprise germanium (Ge) in the collector and base regions for absorption in the 1.3-1.6 µm optical wavelength range, and may be integrated on a CMOS silicon-on-insulator (SOI) wafer.

The analog and digital control circuits 109 may control gain levels or other parameters in the operation of the amplifiers 107A-107D, which may then communicate electrical signals off the CMOS chip 130. The control sections 112A-112D comprise electronic circuitry that enable modulation of the CW laser signal received from the splitters 103A-103C. The optical modulators 105A-105D may require high-speed electrical signals to modulate the refractive index in respective branches of a Mach-Zehnder interferometer (MZI), for example. In an example embodiment, the control sections 112A-112D may include sink and/or source driver electronics that may enable a bidirectional link utilizing a single laser.

In operation, the CMOS chip 130 may be operable to transmit and/or receive and process optical signals. Optical signals may be received from optical fibers by the grating couplers 117A-117D and converted to electrical signals by the photodetectors 111A-111D. The electrical signals may be amplified by transimpedance amplifiers in the amplifiers 107A-107D, for example, and subsequently communicated to other electronic circuitry, not shown, in the CMOS chip 130.

Integrated photonics platforms allow the full functionality of an optical transceiver to be integrated on a single chip, such as the CMOS chip 130, for example. A transceiver chip comprises optoelectronic circuits that create and process the optical/electrical signals on the transmitter (Tx) and the receiver (Rx) sides, as well as optical interfaces that couple the optical signal to and from one or more fibers. The signal processing functionality may comprise modulating the optical carrier, detecting the optical signal, splitting or combining data streams, and multiplexing or demultiplexing data on carriers with different wavelengths. In another example scenario, a plurality of chips may be utilized, with an optical interposer for receiving electronics chips and photonics chips, in instances where the electronics chips and photonics chips are manufactured in different CMOS nodes.

The light source may be external to the chip or may be integrated with the chip in a hybrid scheme. It is often advantageous to have an external continuous-wave (CW) light source, because this architecture allows heat sinking and temperature control of the source separately from the transceiver chip 130. An external light source may also be connected to the transceiver chip 130 via a fiber interface.

An integrated transceiver may comprise at least three optical interfaces, including a transmitter input port to interface to the CW light source, labeled as "CW Laser In 101"; a transmitter output port to interface to the fiber carrying the optical signal, labeled "Optical Signals Out"; and a receiver input port to interface to the fiber carrying the optical signal, labeled "Optical Signals In".

Figure 3:
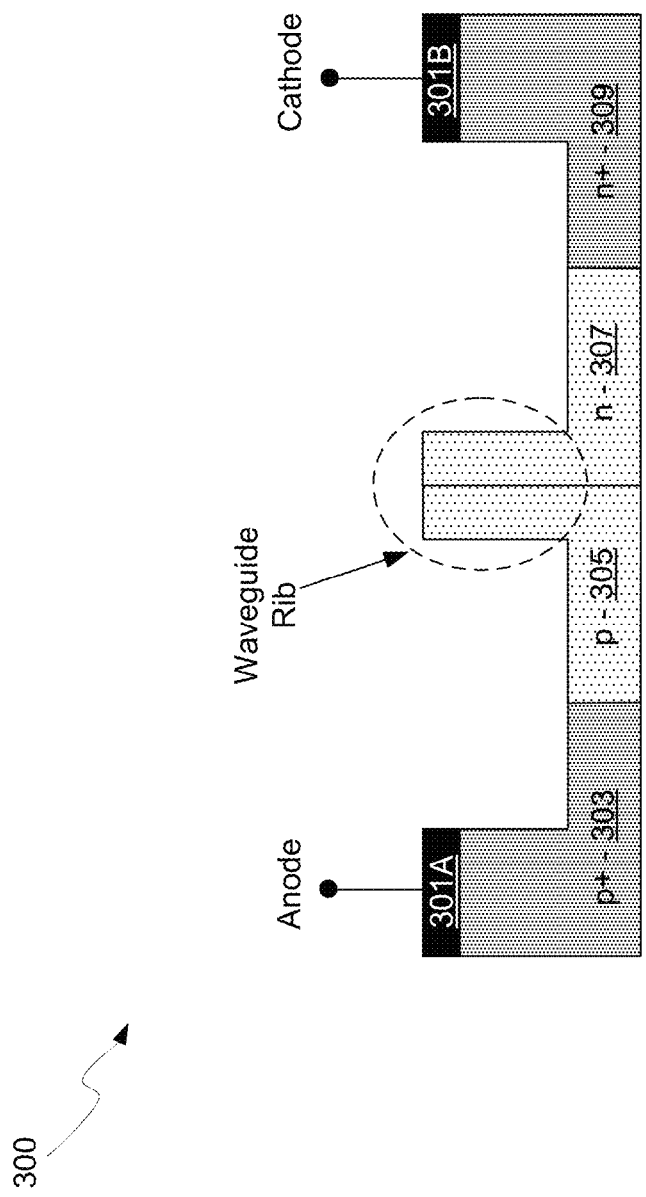
FIG. 3 illustrates a vertical p-n junction optical phase shifter, in accordance with an example embodiment of the disclosure.
Figure 4:
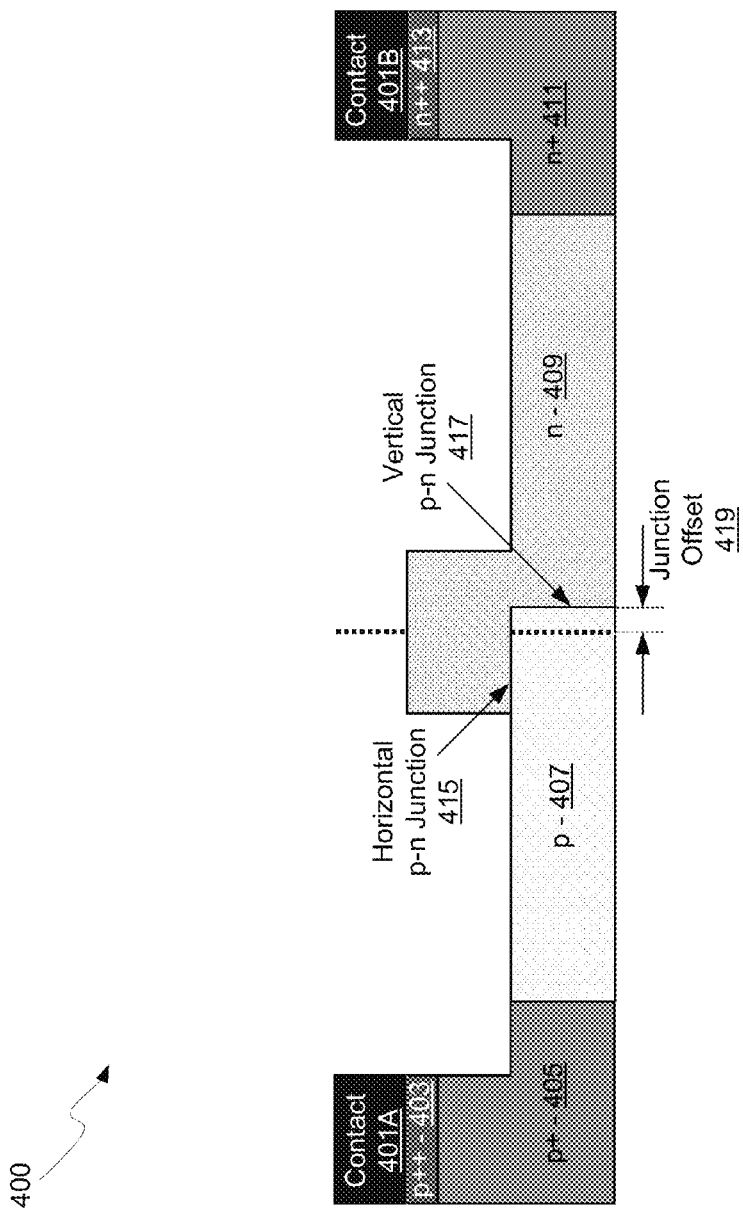
FIG. 4 illustrates a horizontal junction optical phase shifter, in accordance with an example embodiment of the disclosure.

In an example scenario, the optical modulators 105A-105D may comprise low-voltage, high-speed modulators with a horizontal p-n junction design, as shown in at least FIG. 4, which may result in improved modal overlap of the depletion region with the propagating optical mode. This may be compared to a vertical p-n junction design as shown in FIG. 3.

Figure 1B:
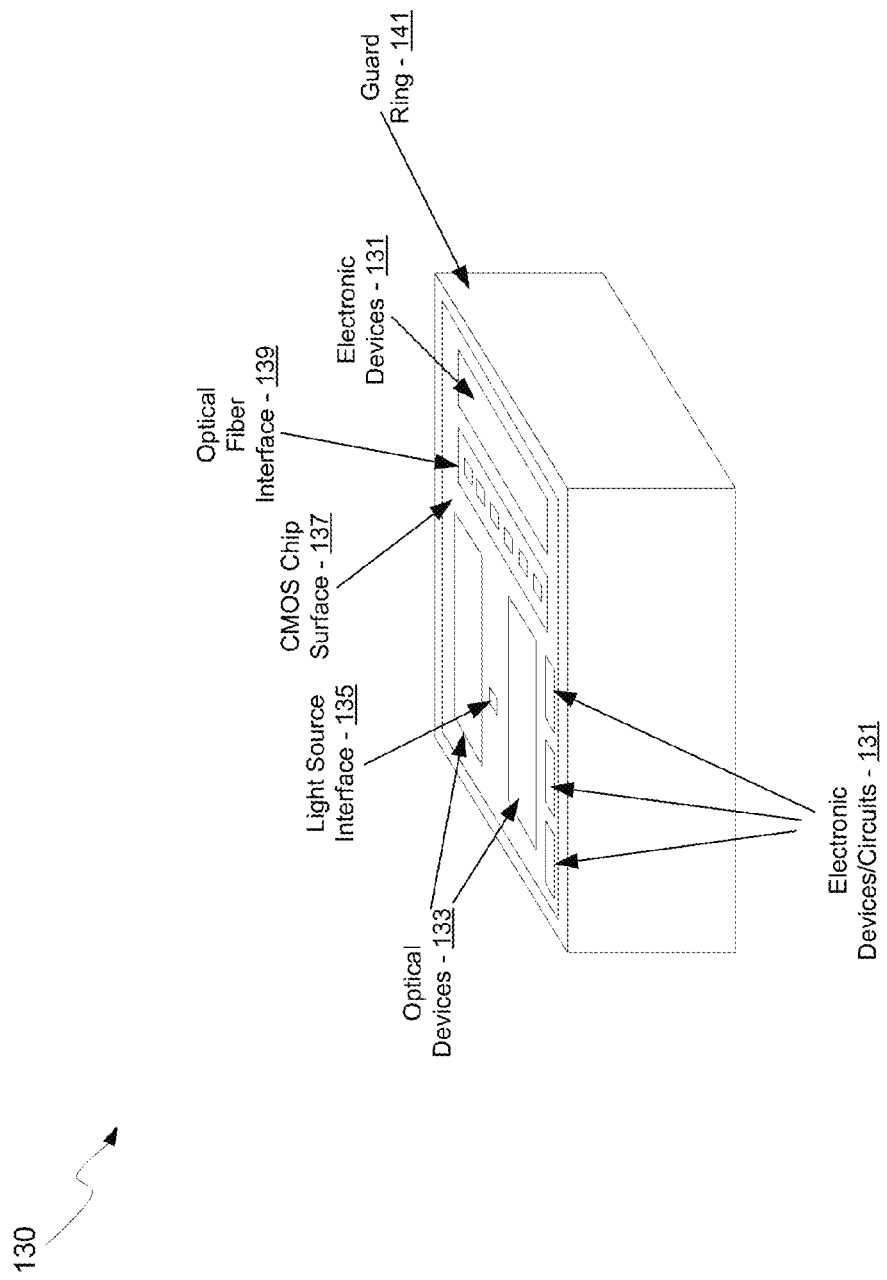
FIG. 1B is a diagram illustrating a CMOS chip, in accordance with an example embodiment of the disclosure.

FIG. 1B is a diagram illustrating an exemplary CMOS chip, in accordance with an exemplary embodiment of the invention. Referring to FIG. 1B, there is shown the CMOS chip 130 comprising electronic devices/circuits 131, optical and optoelectronic devices 133, a light source interface 135, CMOS chip front surface 137, an optical fiber interface 139, and CMOS guard ring 141.

The light source interface 135 and the optical fiber interface 139 comprise grating couplers, for example, that enable coupling of light signals via the CMOS chip surface 137, as opposed to the edges of the chip as with conventional edge-emitting devices. Coupling light signals via the CMOS chip surface 137 enables the use of the CMOS guard ring 141 which protects the chip mechanically and prevents the entry of contaminants via the chip edge.

The electronic devices/circuits 131 comprise circuitry such as the amplifiers 107A-107D and the analog and digital control circuits 109 described with respect to FIG. 1A, for example. The optical and optoelectronic devices 133 comprise devices such as the directional couplers 103A-103K, optical terminations 115A-115D, grating couplers 117A-117H, optical modulators 105A-105D, high-speed heterojunction photodiodes 111A-111D, and monitor photodiodes 113A-113H.

In an example scenario, the optical modulators 105A-105D may comprise low-voltage, high-speed modulators with a horizontal p-n junction design with improved modal overlap of the depletion region with the propagating optical mode.

Figure 1C:
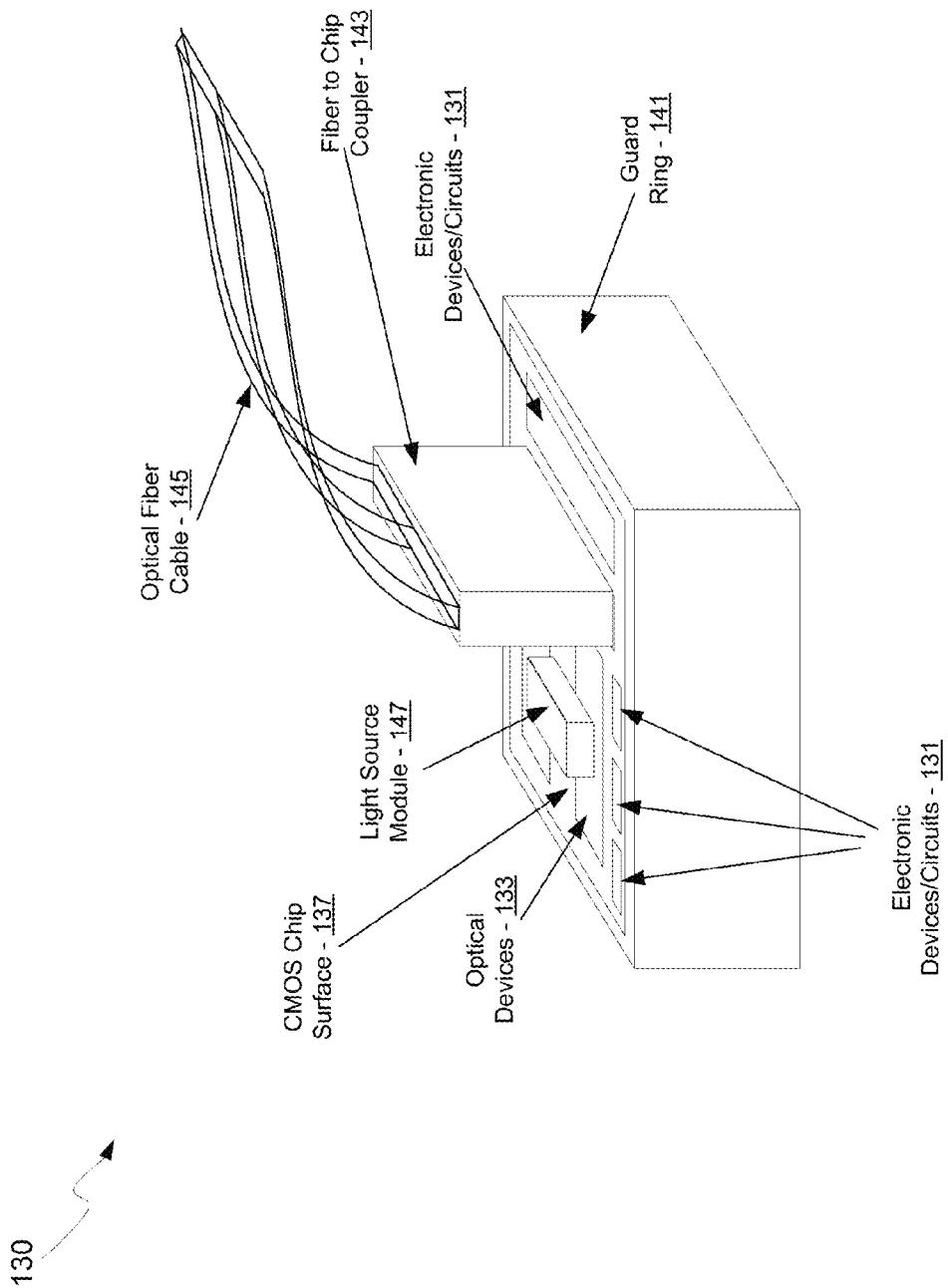
FIG. 1C is a diagram illustrating a CMOS chip coupled to an optical fiber cable, in accordance with an example embodiment of the disclosure.

FIG. 1C is a diagram illustrating a CMOS chip coupled to an optical fiber cable, in accordance with an exemplary embodiment of the invention. Referring to FIG. 1C, there is shown the CMOS chip 130 comprising the CMOS chip surface 137, and the CMOS guard ring 141. There is also shown a fiber-to-chip coupler 143, an optical fiber cable 145, and an optical source assembly 147.

The CMOS chip 130 comprising the electronic devices/circuits 131, the optical and optoelectronic devices 133, the light source interface 135, the CMOS chip surface 137, and the CMOS guard ring 141 may be as described with respect to FIG. 1B.

In an example scenario, the optical modulators 105A-105D may comprise low-voltage, high-speed modulators with a horizontal p-n junction design with improved modal overlap of the depletion region with the propagating optical mode.

FIG. 2 is a schematic illustrating an electro-optic modulator, in accordance with an example embodiment of the disclosure. Referring to FIG. 2, there is shown an optical modulator 200 comprising optical waveguides 201A and 201B and optical phase shifters 203A and 203B. There is also shown an input signal $P_{in}$ 205 and output signals $P_{out}$ 207A and 207B.

The waveguides 201A and 201B may comprise materials of differing dielectric constants such that optical signals are confined. For example, a silicon waveguide with air and/or silicon dioxide cladding may carry optical signals and may come into close proximity at two locations in the optical modulator 200 as shown in FIG. 2, which may result in a transfer of a portion of the optical mode from one waveguide to the other.

The optical phase shifters 203A and 203B may comprise optoelectronic devices that may be operable to shift the phase of received optical signals. For example, p-n junctions formed in the waveguides 201A and 201B may be utilized to shift the phase of optical signals that travel through the depletion region, since the index of refraction is changed with respect to the non-depleted regions of the waveguides. Reverse-biased p-n junctions result in an increased depletion width and thus more phase shift.

Optical modulation amplitude (OMA) is one of the key performance parameters of an electro-optic phase modulator used in digital communication systems. The OMA directly influences the system bit error rate (BER) and hence is desired to be as large as possible. In bi-level optical signaling schemes, the higher level represents a binary one, and the lower power level represents a zero (maximum and minimum of $P_{out}$ in FIG. 2). OMA is defined as the difference between the high and low levels: OMA=max($P_{out}$)−min($P_{out}$).

The magnitude of OMA depends on phase shift difference accumulated between the two arms, waveguides 201A and 201B, of the optical modulator 200 as well as the optical loss that the beam suffers passing through the waveguides. The following equation describes this relation:

$$OMA(L)=P_{in}e^{-\alpha \cdot L} \sin(\theta \cdot L)$$

where $P_{in}$ is the input optical power, α is the optical loss per unit length, L is the length of the modulator and θ is the difference in phase shift between two arms per unit length. As can be seen from the relation, OMA increases with increasing phase shift and decreases by increasing loss. As a result, there is an optimal modulator length, beyond which the OMA no longer improves.

FIG. 3 illustrates a vertical p-n junction optical phase shifter, in accordance with an example embodiment of the disclosure. Referring to FIG. 3, there is shown a p-n junction optical phase shifter 300 comprising p-region 305, n-region 307, contacts 301A and 301B, a p+ region 303 and an n+ region 309. There is also shown an anode and a cathode where electrical connections may be made.

The contacts 301A and 301B may comprise metal layers formed on the p+ region 303 and the n+ region 309, for providing a low-resistance electrical connection to the p-n junction. The p+ region 303 and n+ region may comprise p-type and n-type doped regions, respectively, with higher doping than the p-region 305 and the n-region 307. This higher doping may be useful for reducing the resistance of electrical contact to the p-n junction formed by the p-region 305 and the n-region 307. In another example scenario, a p++ region and an n++ region may be optionally formed under the contacts 301A and 301B, respectively, for better electrical contact, i.e., lower contact resistance.

The waveguide rib shown in FIG. 3 may be formed by etching portions of the p+ region 303, the p-region 305, the n-region 307, and the n+ region 309, with what may considered a "shallow" trench etch as compared to a deep trench etch for isolating optical devices by etching down to the insulator layer in a silicon-on-insulator (SOI) CMOS wafer, for example. In an example scenario, the doping in the p+ region 303, the p-region 305, the n-region 307, and the n+ region 309 may be formed through ion implantation, for example, although other techniques are possible, such as diffusion.

Depletion mode p-n junction modulators are used for high-speed silicon photonics applications because their intrinsic bandwidth may be well beyond 100 GHz. However, their disadvantage is that they generally suffer from smaller phase shifts compared to other means. A typical p-n junction is shown in FIG. 3, where the vertical p-n junction is placed in the middle of the waveguide rib where the optical mode propagates. The phase shift limitation in this type of modulator is due to the poor modal overlap of the vertical depletion region with the propagating optical mode.

FIG. 4 illustrates a horizontal junction optical phase shifter, in accordance with an example embodiment of the disclosure. Referring to FIG. 4, there is shown a horizontal junction optical phase shifter 400 comprising contacts 401A and 401B, a p++ region 403, a p+ region 405, a p-region 407, an n-region 409, an n+ region 411, and an n++ region 413. There is also shown a horizontal p-n junction 415, a vertical p-n junction 417, and a junction offset 419, the latter corresponding to the width between the vertical p-n junction 417 and the center of the rib.

The contacts 401A and 401B, p+ region, and n+ region 411 may be similar to the similarly named elements of FIG. 3, and the p++ region 403 and n++ region 413 may be p- and n-doped regions, respectively, with higher doping levels than the p+ and n+ regions for improved contact resistance.

The structure of the p-region 407 and the n-region 409, however, is modified compared to FIG. 3 in that the p-n junction is now "L" shaped with a horizontal junction 415 and a vertical junction 417. The p-layer 407 and a portion of the n-layer 409 may be coplanar while a second portion of the n-layer may be formed above the p-layer 407 and a portion of the n-layer 409. This profile was determined through rigorous process, electrical, and optical simulations and provides a significantly improved modal overlap of the depletion region with the propagating optical mode. As a result, OMA is greatly improved over previous designs.

Depending on the junction offset 419, the length of the horizontal p-n junction 415 may be varied and a mostly horizontal p-n junction can be achieved. This mixed junction geometry can be realized by adjusting the implantation process to implant the upper and lower portions of the waveguide separately. In an example scenario, three implantation steps may be utilized for each section, i.e., the p-layer 407, the lower portion of the n-layer 409, the upper portion of the n-layer 409. The energy and dose of each implantation step, as well as the horizontal and vertical location of the junction, may be optimized to achieve the highest possible improvement in the OMA. Moreover, this choice may be balanced to ensure an un-depleted, low-impedance path to the edge of the depletion regions under all biasing conditions used in the modulator, which may assure that the phase shift of a modulator utilizing the horizontal junction optical phase shifter 400 does not degrade at higher frequencies.

In operation, the optical phase shifter 400 may be reverse biased for increased phase shift per unit length, as the depletion width is increased with reverse bias. For example, devices with the structure illustrated in FIG. 4 have exhibited over 22 degrees/mm at 1.8V bias. A modulating signal may also be applied across the contacts 401A and 401B to modulate an optical signal traveling through the phase shifter 400, which may travel into or out of the plane of the structure in FIG. 4.

Figure 5:
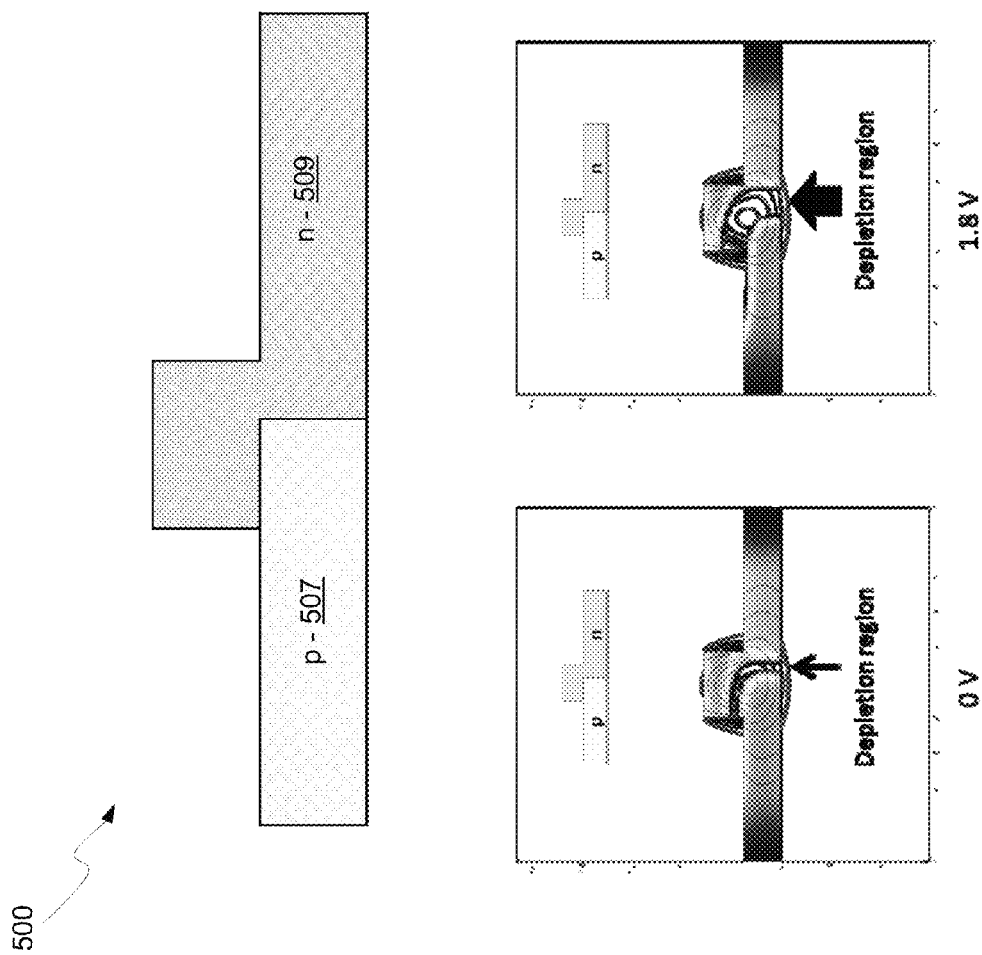
FIG. 5 illustrates modeling results for a horizontal junction optical phase shifter, in accordance with an example embodiment of the disclosure.

FIG. 5 illustrates modeling results for a horizontal junction optical phase shifter, in accordance with an example embodiment of the disclosure. Referring to FIG. 5, there are shown simulation results for the horizontal p-n junction comprising the p-layer 507 and n-layer 509. The plots below illustrate how the depletion width of an exemplary junction grows as the reverse voltage is varied from 0V to 1.8V.

The horizontal junction allows for the depletion width to grow mostly where the intensity of the optical mode is also highest, as illustrated by the contour lines indicating the optical mode intensity. At the same time, the design is such that at the widest depletion width, there is still some un-depleted, low impedance path to the edge of the depletion region. A modulator with the modeled horizontal junction optical phase shifters may result in a 2 dB improvement in OMA over a modulator with vertical junction optical phase shifters.

In an example embodiment, a method and system are disclosed for a low-voltage integrated silicon high-speed modulator. In this regard, aspects of the disclosure may comprise optical modulator comprising first and second optical waveguides and two optical phase shifters, where each of the two optical phase shifters comprising a p-n junction with a horizontal section and a vertical section, and where optical signal is communicated to the first optical waveguide. A portion of the optical signal may then be coupled to the second optical waveguide.

A phase of at least one optical signal in the first and second waveguides may be modulated utilizing the optical phase shifters. A portion of the phase modulated optical signals may be coupled between the two waveguides, thereby generating two output signals from the modulator. A modulating signal may be applied to the phase shifters for modulating the phase of the at least one optical signal. The p-n junction of the phase shifters may be reverse biased.

The horizontal and vertical sections of the p-n junction may form an "L" shape. The p-n junction may comprise three rectangular sections, a first section being a p-type semiconductor layer, a second section being a portion of an n-type semiconductor layer coplanar with the first section, and a third section being another portion of the n-type semiconductor layer but formed above the first and second sections. The p-n junction may be reverse biased such that a depletion width of the p-n junction extends across most but not all of the third section. The modulator may be integrated in silicon. The horizontal and vertical sections of the p-n junction may be formed in a waveguide rib. The modulator may be integrated in a CMOS chip. The p-n junction may be formed by ion implantation.

As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the term "exemplary" means serving as a non-limiting example, instance, or illustration. As utilized herein, the terms "e.g.," and "for example" set off lists of one or more non-limiting examples, instances, or illustrations. As utilized herein, a device/module/circuitry/ etc. is "operable" to perform a function whenever the device/module/circuitry/etc. comprises the necessary hardware and code (if any is necessary) to perform the function, regardless of whether performance of the function is disabled, or not enabled, by some user-configurable setting.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for communication, the method comprising:
in an optical modulator comprising first and second optical waveguides and two optical phase shifters, each of the two optical phase shifters comprising a p-n junction with a horizontal section and a vertical section, wherein in each of the two optical phase shifters, a first of a p-doped region and an n-doped region is in a slab waveguide portion and in a rib waveguide portion of the phase shifters and a second of the p-doped region and n-doped region is only in the slab waveguide portion, and wherein in each of the two optical phase shifters, p+ and p++ regions and n+ and n++ regions extend above a top surface of the waveguide portion of the phase shifters such that the p++ and n++ regions are at a same height as a top of the rib waveguide portion:
communicating an optical signal to the first optical waveguide, wherein a portion of the optical signal is coupled to the second optical waveguide;
modulating a phase of at least one optical signal in the first and second waveguides utilizing the optical phase shifters; and
coupling a portion of the phase modulated optical signals between the two waveguides, thereby generating output signals from both output waveguides of the modulator.

2. The method according to claim 1, comprising reverse-biasing the p-n junction of the phase shifters.

3. The method according to claim 1, comprising applying a modulating signal to the phase shifters.

4. The method according to claim 1, wherein the horizontal and vertical sections of the p-n junction form an "L" shape.

5. The method according to claim 1, wherein the p-n junction comprises three rectangular sections, a first section being a p-type semiconductor layer, a second section being a portion of an n-type semiconductor layer coplanar with the first section, and a third section being another portion of the n-type semiconductor layer but formed above the first and second sections.

6. The method according to claim 5, comprising reverse biasing the p-n junction such that a depletion width of the p-n junction extends across most but not all of the third section.

7. The method according to claim 1, wherein the modulator is integrated in silicon.

8. The method according to claim 1, wherein the horizontal section of the p-n junction is at an intersection of the rib waveguide portion and the slab waveguide portion and the vertical section of the p-n junction is only in the slab waveguide portion.

9. The method according to claim 1, wherein the modulator is integrated in a CMOS chip.

10. The method according to claim 1, wherein the p-n junction is formed by ion implantation.

11. A system for communication, the system comprising:
an optical modulator comprising first and second optical waveguides and two optical phase shifters, wherein each of the two optical phase shifters comprises a p-n junction with a horizontal section and a vertical section, wherein in each of the two optical phase shifters, a first of a p-doped region and an n-doped region is in a slab waveguide portion and in a rib waveguide portion of the phase shifters and a second of the p-doped region and n-doped region is only in the slab waveguide portion, wherein in each of the two optical phase shifters, p+ and p++ regions and n+ and n++ regions extend above a top surface of the waveguide portion of the phase shifters such that the p++ and n++ regions are at a same height as a top of the rib waveguide portion, and wherein the optical modulator is operable to:
receive an optical signal in the first optical waveguide,
couple a portion of the optical signal from the first waveguide to the second optical waveguide;
modulate a phase of at least one optical signal in the first and second waveguides utilizing the optical phase shifters; and
couple a portion of the phase modulated optical signals between the first and second waveguides, thereby generating output signals into both output waveguides of the modulator.

12. The system according to claim 11, wherein said phase shifters are reverse-biased.

13. The system according to claim 11, wherein said modulator is operable to modulate a received signal when a modulating signal is applied to the phase shifters.

14. The system according to claim 11, wherein the horizontal and vertical sections of the p-n junction form an "L" shape.

15. The system according to claim 11, wherein the p-n junction comprises three rectangular sections, a first section being a p-type semiconductor layer, a second section being a portion of an n-type semiconductor layer coplanar with the first section, and a third section being another portion of the n-type semiconductor layer but formed above the first and second sections.

16. The system according to claim 11, wherein a reverse bias is applied to the p-n junction such that a depletion width of the p-n junction extends across most but not all of the third section.

17. The system according to claim 11, wherein the modulator is integrated in silicon.

18. The system according to claim 11, wherein the horizontal section of the p-n junction is at an intersection of the rib waveguide portion and the slab waveguide portion and the vertical section of the p-n junction is only in the slab waveguide portion.

19. The system according to claim 11, wherein the p-n junction is formed by ion implantation.

20. A system for communication, the system comprising:
an optical modulator in a silicon photonic transceiver, said optical modulator comprising:
first and second optical waveguides;
first and second optical phase shifters, each of the two optical phase shifters comprising a rib waveguide section on top of a slab waveguide section and a p-n junction with a horizontal section and a vertical section, wherein the horizontal section is formed by a portion of an n-doped layer formed on a p-doped layer where the p-doped layer is only in the slab waveguide section, and the vertical portion is formed by another portion of the n-doped layer that is in the same plane as the p-doped layer, and wherein in each of the first and second optical phase shifters, p+ and p++ regions and n+ and n++ regions extend above a top surface of the slab waveguide section of the phase shifters such that the p++ and n++ regions are at a same height as a top of the rib waveguide section, and wherein the optical modulator is operable to:

receive an optical signal in the first optical waveguide, couple a portion of the optical signal from the first waveguide to the second optical waveguide;

modulate a phase of at least one optical signal in the first and second waveguides utilizing the optical phase shifters; and couple a portion of the phase modulated optical signals between the first and second optical waveguides, thereby generating output signals into both output waveguides of the modulator.

* * * * *